(12) United States Patent
Nie

(10) Patent No.: US 6,751,263 B1
(45) Date of Patent: Jun. 15, 2004

(54) METHOD FOR THE ORTHOGONAL FREQUENCY DIVISION MODULATION AND DEMODULATION

(75) Inventor: Xiaoning Nie, Vaterstetten (DE)

(73) Assignee: Infineon Technologies AG, Munich (DE)

( * ) Notice: Subject to any disclaimer, the term of this patent is extended or adjusted under 35 U.S.C. 154(b) by 688 days.

(21) Appl. No.: 09/608,562

(22) Filed: Jun. 30, 2000

(30) Foreign Application Priority Data

Jun. 30, 1999 (DE) ......................................... 199 30 192

(51) Int. Cl.$^7$ ............................................. H04L 27/28
(52) U.S. Cl. .......................... 375/260; 370/210; 455/59
(58) Field of Search ............................... 375/260, 261, 375/267, 295, 316, 347, 349; 455/59, 60; 370/203, 204, 206, 208, 210

(56) References Cited

U.S. PATENT DOCUMENTS

| | | | |
|---|---|---|---|
| 5,825,241 A | 10/1998 | Beale et al. | 329/304 |
| 6,359,938 B1 * | 3/2002 | Keevill et al. | 375/316 |
| 6,404,806 B1 * | 6/2002 | Ginesi et al. | 375/222 |
| 6,459,678 B1 * | 10/2002 | Herzberg | 370/203 |
| 6,590,893 B1 * | 7/2003 | Hwang et al. | 370/354 |

FOREIGN PATENT DOCUMENTS

| | | |
|---|---|---|
| DE | 197 13 631 A1 | 10/1998 |
| DE | 197 46 507 A1 | 4/1999 |

OTHER PUBLICATIONS

William Y. Zou et al.: "COFDM: An Overview", IEEE Transactions on Broadcasting, vol. 41, No. 1, Mar. 1995, pp. 1–8.

* cited by examiner

*Primary Examiner*—Chieh M. Fan
(74) *Attorney, Agent, or Firm*—Laurence A. Greenberg; Werner H. Stemer; Ralph E. Locher

(57) ABSTRACT

In orthogonal frequency division modulation, use is made of the fact that the individual carriers which are transmitted on the principle of frequency multiplexing are orthogonal to one another. The modulation can then be carried out relatively simply using discrete Fourier transformation. Sicne the calculation of the discrete Fourier transformation involves a large number of multiplications, the bit data which are intended to be modulated onto the carriers are combined in each case to form a two-dimensional vector. The vector is supplied to a two-dimensional inverse Fourier transformation as the input variable. The number of multiplications required is thus reduced. The invention is particularly suitable for transmission of broadcast radio, television and mobile radio signals.

4 Claims, 2 Drawing Sheets

METHOD FOR THE ORTHOGONAL FREQUENCY DIVISION MODULATION AND DEMODULATION

Figure 1:
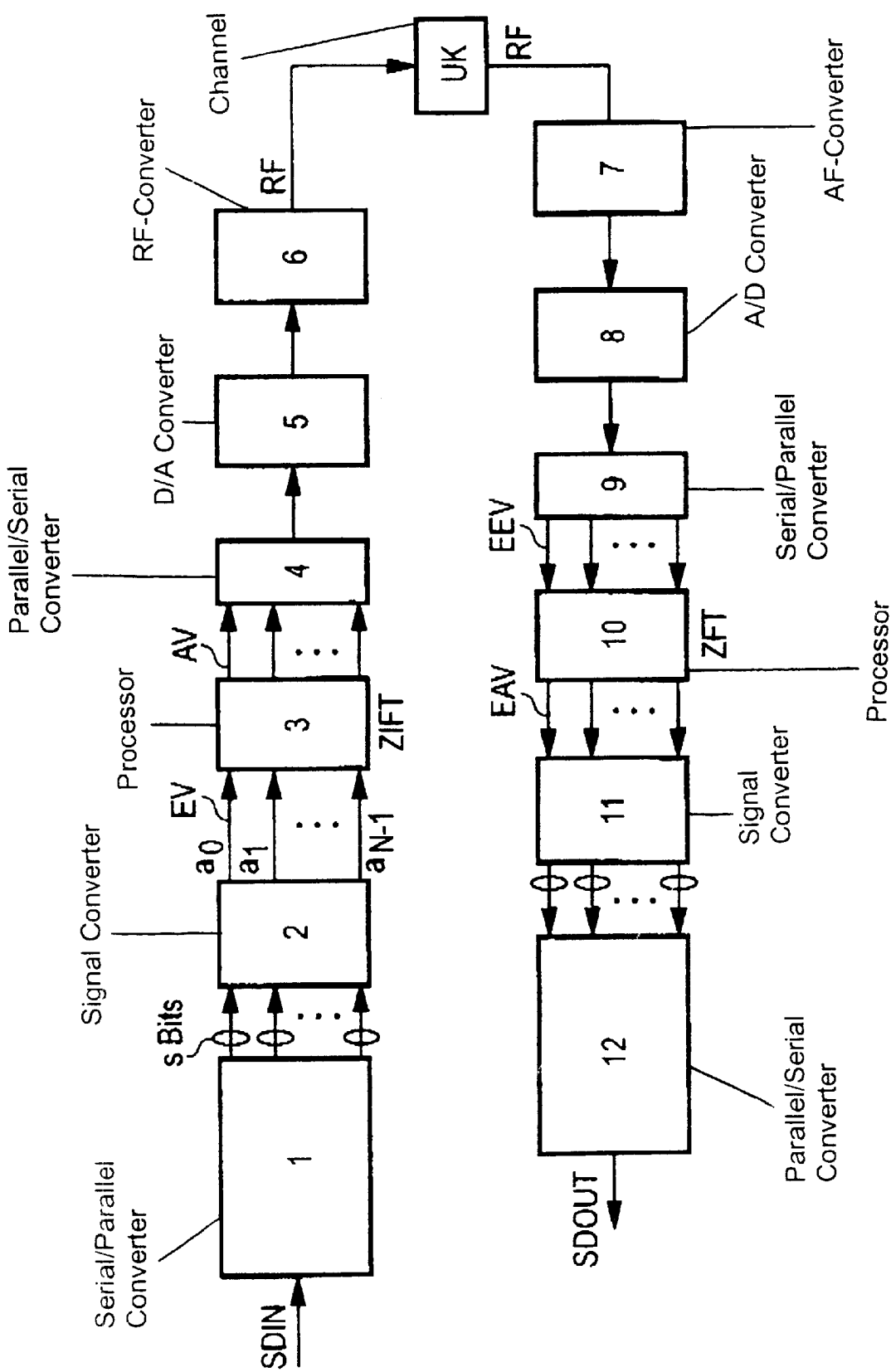

The invention relates to OFDM (Orthogonal Frequency Division Multiplexing) methods as are used for example for transmission of digital broadcast radio and television signals via terrestrial radio channels.

OFDM modulation is a digital modulation method; the message signal, which is in digital form, is in this case applied to carrier signals. The data stream to be transmitted is split into r parts, which are sent in parallel on r carriers. This is therefore also referred to as a multicarrier modulation method.

The OFDM method allows high-quality transmission even in difficult transmission conditions, for example in the presence of multipath propagation. In the presence of multipath propagation, reflections are superposed on the main signal, which are offset in time with respect to the directly received signal. Reflections of the transmitted signal occur on obstructions such as buildings or mountains. The individual echoes which arrive successively at the receiver in general have different amplitudes and delay times. After being superposed on the main signal, they result in fluctuations in the complex channel transmission function. If the discrepancies in the delay times are in the same order of magnitude as the duration of the data bits to be transmitted, adjacent bits can interfere with one another. A group of data bits which represent a specific amplitude level is referred to as a symbol. If the delay times of the various echo signals are greater than the value of the symbol duration, this leads to mutual interference of a correspondingly large number of adjacent symbols. This is referred to as intersymbol interference. Since the duration of the transmitted symbols is lengthened, the intersymbol interference can be reduced.

In the OFDM method, this is done by transmitting a plurality of symbols in parallel. If the information to be transmitted is simultaneously modulated, for example, onto 1000 symbols at different carrier frequencies, then one timeslot which originated before the parallelization of all 1000 sequentially transmitted symbols is available for each individual symbol. The frequency band required for transmission of an individual symbol is reduced by the corresponding value. The total bandwidth of all the individual symbols remains approximately constant in comparison with the broadband-modulating single-carrier method. The modulation of the sub-carriers, that is to say of the carriers at the various frequencies, is carried out by means of a digital single-carrier method. Quadrature amplitude modulation (QAM) or quadrature phase shift keying (QPSK) is often used for this purpose.

In the OFDM method, there is a limitation that all the sub-carrier frequencies are orthogonal to one another. This means that all the sub-carrier frequencies are integer multiples of a specific fundamental frequency. The advantage in this case is that the computation rule of inverse Fourier transformation can be used for transformation and the computation rule of Fourier modulation can be used for demodulation. Algorithms for these computation rules are known which can be carried out with relatively few computation operations.

Discrete (inverse) Fourier transformations are generally used for modulation and demodulation purposes since they can be carried out quickly by signal processors. In discrete transformation, signal values relating to discrete points in time are used as input variables instead of a signal which is constant over time.

When carrying out an (inverse) Fourier transformation, sums of a large number of multiplications are calculated. The time period required for the calculation is governed by the number of multiplications to be carried out. Efficient methods for (inverse) Fourier transformation are known, for example the fast Fourier transformation (FFT).

The data rate to be processed for modulation and demodulation of television signals is wide. When using discrete (inverse) Fourier transformation, it depends primarily on the number of multiplications to be carried out. A digital signal processor (DSP) requires a specific time for one multiplication. The total duration for all the multiplications required for transformation of the values of the input variables thus limits the maximum possible data rate. An overview of methods for orthogonal frequency division modulation is given in the article COFDM: An overview by William Y. Zou and Yijan Wu in IEEE Transactions on Broadcasting, Vol. 41, No. 1, March 1995, pages 1 to 8.

SUMMARY OF THE INVENTION

The object of the present invention is to specify methods for orthogonal frequency division modulation and demodulation which are carried out by an (inverse) Fourier transformation, and in which fewer multiplications need be carried out than with the known transformation methods.

With regard to modulation, the object is achieved by a method having the features of patent claim 1. With regard to demodulation, the object is achieved by a method having the features of patent claim 3.

The invention has the advantage that, if the processing speed of a processor remains constant, a higher data rate can be achieved for modulation and demodulation.

A further advantage is that existing OFDM systems which operate using fast Fourier transformation can be upgraded without changing the signal flow in the system in order to carry out the method according to the invention.

Advantageous refinements and developments are characterized in dependent claims.

The invention will be described in the following in detail with reference to the figures in an exemplary embodiment.

BRIEF DESCRIPTION THE DRAWING

FIG. 1: shows an OFDM system for carrying out the methods according to the invention, and FIG. 2: respectively shows an I/Q diagram for 16 QAM and 16 QPSK modulation.

DESCRIPTION OF THE PREFERRED EMBODIMENT

According to a system for orthogonal frequency division modulation (OFDM system) as shown in FIG. 1, a digital serial data stream SDIN is supplied to a serial/parallel converter 1. The data stream is derived, for example, from an analog user signal which is intended to be modulated onto a carrier. Let us assume for example, a continues sequence of individual bits is transmitted, by means of which the information in the user signal is coded. The task of the serial/parallel converter 1 is to combine each of the bits in the data stream SDIN which follow one another in time to form groups with a specific number s of bits. In this case, s is a natural number greater than zero. Bits which represent a digital value are in each case combined in a group. If 4 bits are in each case combined, then a group describes one of 16 possible values ($2^4$=16). This value in turn is, for example, a measure of a complex amplitude relating to a specific sampling time from the analog user signal.

The fact that OFDM is a multicarrier system has already been described. If N carriers are envisaged for modulation, then the serial/parallel converter 1 forms N groups of s bits each. One group of s bits is referred to in the following text as an individual symbol ES. N individual symbols are thus formed.

Figure 2B:
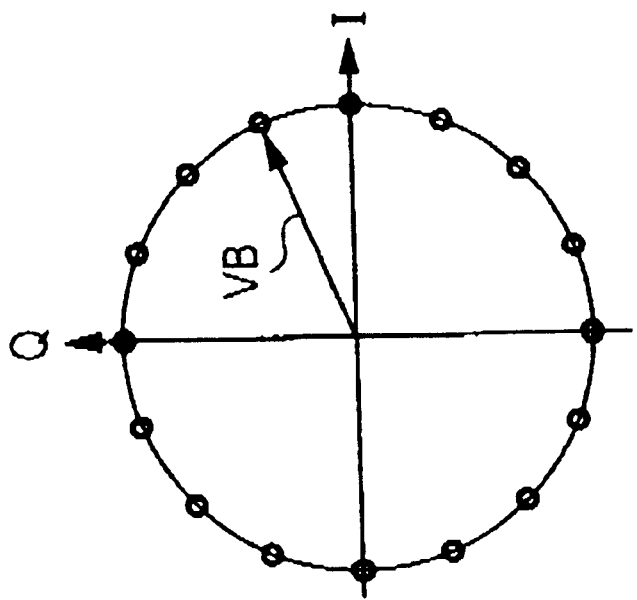
Figure 2A:
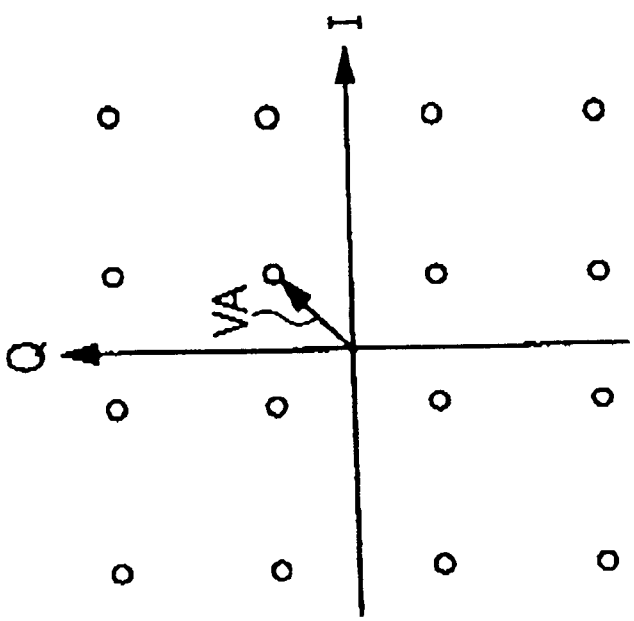

Each individual symbol ES is assigned a complex number $a_i$ in accordance with an imaging rule in a signal converter 2. The imaging rule is in this case governed by the type of modulation which is envisaged for the respective carrier. By way of example, FIG. 2 shows imaging rules using two I/Q diagrams which represent signals as vectors in phase space. I is the signal component which is in phase with the carrier signal, while Q describes the quadrature component at right angles to the carrier phase. In FIG. 2a, 16 curls which represent 16 values are distributed uniformly in phase space. Quadrature amplitude modulation is thus described schematically by 16 values (16 QAM). Each curl represents a digital value which is transmitted by 4 bits. If the I axis is regarded as the real axis and the Q axis as the imaginary axis, then a complex number can be assigned to each of the 16 digital values (0000, 0001, . . . , 1111). In FIG. 2a, one complex number is emphasized as the vector VA. A complex number is assigned to the same digital value using the imaging rule in FIG. 2b, and this is represented by a vector VB. FIG. 2b shows the I/Q diagram for phase shift keying (PSK modulation, phase shift keying) with 16 values (16 PSK). These imaging rules are only by way of example. Imaging rules which are used for other digital types of modulation are also possible.

The signal converter 2 thus produces complex numbers $a_0$ to $a_{N-1}$. These N complex numbers are passed as an input variable EV to a processor 3. According to the invention, the processor 3 carries out a two-dimensional discrete inverse Fourier transformation ZIFT. It uses the input variables EV with values $a_{M1,M2,N}$ to produce an output variable AV with values $u_n$ (K1,K2) using the following computation rule:

$$u_N(K1, K2) = \sum_{M1=0}^{N-1} \sum_{M2=0}^{N-1} a_{M1,M2,N} \cdot e^{2j\pi M1K1/N} \cdot e^{2j\pi M2K2/N}$$

The indexes M1, M2 are running variables in the sum formulae. e denotes the exponential function. N denotes the number of values of the input variables. 4 bits are required to describe, for example, 16 different values. The complex numbers $a_0$ to $a_{N-1}$ correspond to the value of the input variables. K1 and K2 denote various sampling times at which the input variable is validly present at the processor 3. If the time period τ is available for sampling the N values, then, for equidistant sampling, the sample times become $$t_1 = \frac{K1 \cdot \tau}{N} \text{ and } t_2 = \frac{K2 \cdot \tau}{N}$$

If, for example, the interval between sampling times is 100 ms, then the processor 3 processes 100 values of the input variables per second.

The sampling times $t_1$ and $t_2$ can be described by a time unit or can simply be numbered consecutively on the basis of the equidistance using K1 and K2.

The modulation can then be described as follows:

$$s(t_1, t_2, t) = \sum_{i=-\infty}^{\infty} u_N(K1, K2) \cdot \delta(t - i \cdot \tau_0) \cdot Rect(t_1) \cdot Rect(t_2)$$

where δ( ) is a delta function and Rec( ) is a rectangular function.

Since the processor 3 carries out a two-dimensional transformation ZIFT, the input variable EV must also be two-dimensional. To this end a two-dimensional vector is formed from the complex numbers $a_0$ to $a_{N-1}$. The complex numbers are not interpreted as a one-dimensional vector, but as a two-dimensional vector or matrix. An example using M=4 should clarify this. A one-dimensional vector contains, for example, the values $a_1$, $a_2$, $a_3$, $a_4$. As a two-dimensional vector, the values are indexed differently: $a_{11}$, $a_{12}$, $a_{21}$, $a_{22}$.

The processor 3 uses the ZIFT rule to produce an output variable AV, which likewise contains N values. These values are at the same time available at an output of the processor 3. A parallel/serial converter 4 outputs the values of the output variables AV successively at a clock period which corresponds to the clock for sampling. A digital/analog converter 5 converts the digital values to an analog continuous baseband signal BS. A radio-frequency converter 6 converts the baseband signal BS to a radio frequency RF with which transmission is possible. As a rule, this frequency is in the kHz or GHz ranges. Transmission takes place via a transmission channel UK, such as the atmosphere or a cable.

In order to recover the serial data input stream SDIN, a receiving unit is provided within the OFDM system. This contains an audio-frequency converter 7, which receives the radio-frequency signal RF and converts it to the baseband signal. The baseband signal BS is converted back to a digital signal again in an analog/digital converter 8. A further serial/parallel converter 9 once again combines s bits to form an individual symbol, and forms a received input variable EEV from N individual symbols. A receiving processor 10 uses the values of the received input variables EEV to form values of a received output variable EAV. The receiving processor 10 carries out a two-dimensional discrete Fourier transformation ZFT. The ZFT can be mathematically described as follows:

$$b_N(K1, K2) = \sum_{M1=0}^{N-1} \sum_{M2=0}^{N-1} v_{M1,M2,N} \cdot e^{-2j\pi M1K1/N} \cdot e^{-2j\pi M2K2/N}$$

$MV_{1,M2,N}$ are the values of the received input variables EEV. $b_N$ (K1,K2) are the values of the received output variables EAV. The meanings of the o the r parameters and indices match those of the ZIFT. In the case of ideal transmission, that is to say, for example, where no echoes or attenuations occur, the $a_{M1,M2,N}$ correspond to the $b_N$ (K1, K2). Thus, in ideal conditions, the complex numbers $a_0$ to $a_{N-1}$ are present at the reception end again.

The received output variable EAV is passed on to a further signal converter 11. This carries out a conversion which is the inverse of that in the signal converter 2. The imaging rule used by it is the inverse of that used in the signal converter 2. The further signal converter 11 uses the values $b_0$ to $b_{N-1}$ of the received output variables EAV to produce N individual symbols which, theoretically and in ideal conditions, correspond to the individual symbols of the output of the serial/parallel converter 1. The complex numbers $b_l$ to $b_0$ are organized into N groups of s bits each. One group of s bits in each case represents an individual symbol.

The N individual symbols are passed to a further parallel/serial converter 12. This outputs the N individual symbols as a serial data output stream SDOUT.

Once again on the assumption that the transmission conditions are ideal, with no interference and no bit errors occurring, the serial data output stream SDOUT corresponds to the serial data input stream SDIN.

The described method uses a discrete Fourier transformation, which is carried out as a two-dimensional function. In principle, the method can also be carried out with higher-dimension transformations, for example three-dimensional or four-dimensional transformations.

What is claimed is:

1. A method for orthogonal frequency division modulation, which comprises the following steps:

combining a number s bits from a serial bit data stream to form an individual symbol;

assigning a complex number to each individual symbol corresponding to a value of the bits of the respective individual symbol;

combining a plurality of the complex numbers to form a two-dimensional vector, and subjecting the complex numbers to two-dimensional inverse Fourier transformation with the respective two-dimensional vector as input variables;

converting output values of the inverse Fourier transformation in serial form with a digital/analog converter to an analog baseband signal.

2. The method according to claim 1, wherein the two-dimensional inverse Fourier transformation is mathematically described by:

$$u_N(K1, K2) = \sum_{M1=0}^{N-1} \sum_{M2=0}^{N-1} a_{M1,M2,N} \cdot e^{2j\pi M1K1/N} \cdot e^{2j\pi M2K2/N},$$

where $a_{M1,M2,N}$ represent values of the input variables the indexes M1 and M2 are running variables, N denotes a number of values of the input variables, K1 and K2 denote various sampling times at which the input variables are validly present at a processor and UN(K1,K2) represent values of the output variables.

3. A method for orthogonal frequency division demodulation, which comprises the following steps:

converting an analog baseband signal with an analog/digital converter to a serial signal having a sequence of digital values;

combining a number of digital values of the serial signal to form individual symbols and forming received input variables from the individual symbols;

subjecting the received input variables as input variables to a two-dimensional Fourier transformation forming received output variables each being a complex number representing a two-dimensional vector;

converting the two-dimensional vectors into groups of bits representing individual output symbols in a signal converter; and forming a serial data output stream from the individual output symbols in a parallel/serial converter.

4. The method according to claim 3, wherein the two-dimensional Fourier transformation is mathematically described by:

$$b_N(K1, K2) = \sum_{M1=0}^{N-1} \sum_{M2=0}^{N-1} v_{M1,M2,N} \cdot e^{-2j\pi M1K1/N} \cdot e^{-2j\pi M2K2/N},$$

where $V_{M1,M2,N}$ represent values of the input variables the indexes M1 and M2 are running variables, N denotes a number of values of the input variables, K1 and K2 denote various sampling times at which the input variables are validly present at a processor and $b_N$ (K1,K2) represent values of the output variables.

* * * * *